United States Patent [19]
Eddy et al.

[11] 3,727,969
[45] Apr. 17, 1973

[54] RAILROAD BEARING STRUCTURES

[75] Inventors: Thomas A. Eddy, Mahwah; Charles E. White, Franklin Lakes, both of, N.J.

[73] Assignee: Abex Corporation, New York, N.Y.

[22] Filed: Feb. 8, 1971

[21] Appl. No.: 113,309

[52] U.S. Cl. ............295/36 R, 151/54, 151/60, 105/218
[51] Int. Cl. ................................B60b 35/00
[58] Field of Search.............151/54, 53, 60, 44, 151/55, 54; 295/38; 105/218; 308/180

[56] References Cited

UNITED STATES PATENTS

| | | | |
|---|---|---|---|
| 1,367,985 | 2/1921 | Nainka | 151/60 |
| 2,370,944 | 3/1945 | Emerson | 151/54 |
| 3,523,709 | 8/1970 | Heggy et al. | 151/53 |
| 377,307 | 1/1888 | Johnson | 151/54 |
| 1,110,335 | 9/1914 | Morewood | 151/54 |
| 2,407,928 | 9/1946 | Herreshoff | 151/54 |
| 1,915,088 | 6/1933 | Eastburg | 151/54 |

*Primary Examiner*—Edward C. Allen
*Attorney*—Kinzer and Dorn

[57] ABSTRACT

Bolts used to secure the end cap of a bearing structure to the end of a railroad car axle are secured against loosening by the conjoint action of bent tabs on a template and a plurality of lock plates arranged in a unique way to cooperate with a shoulder on the end cap.

1 Claim, 4 Drawing Figures

PATENTED APR 17 1973
3,727,969
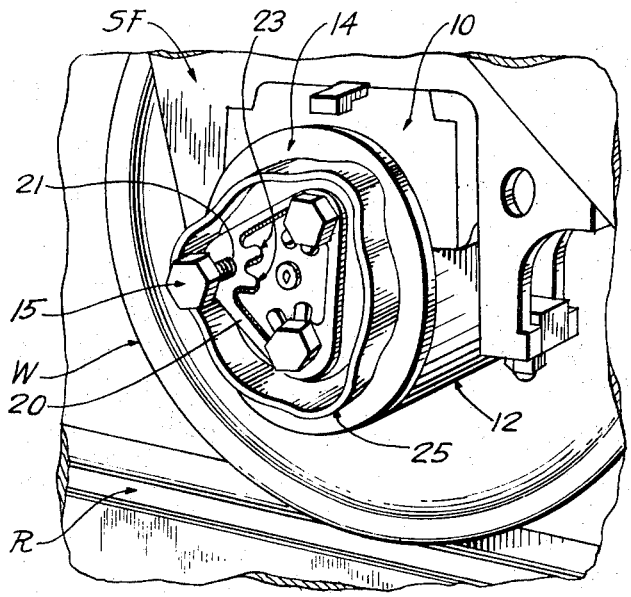
FIG. 1
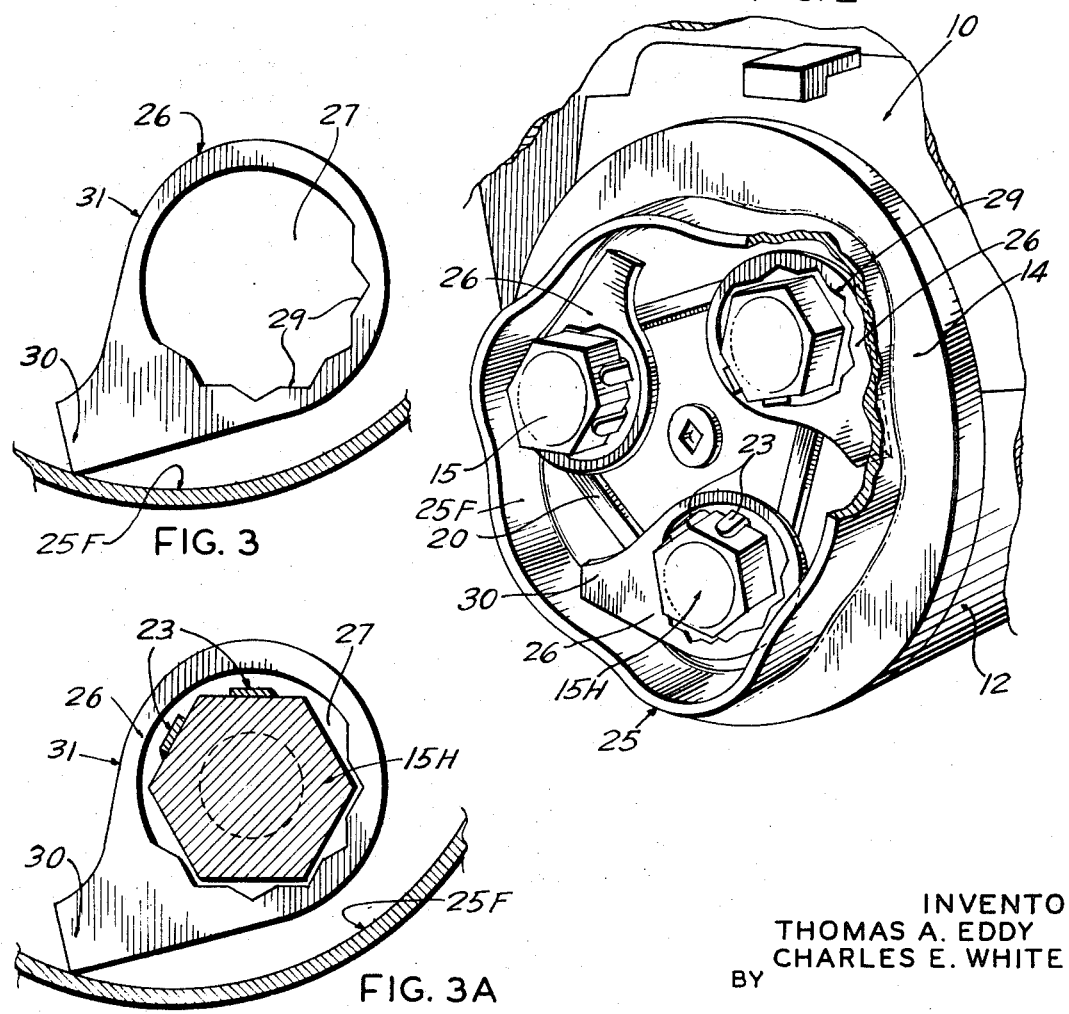
FIG. 2
FIG. 3
FIG. 3A
INVENTORS.
THOMAS A. EDDY
CHARLES E. WHITE
BY
Kinzer, Dorn and Zickert
ATTORNEYS

RAILROAD BEARING STRUCTURES

This invention relates to a bearing structure for the journal of a railroad car axle and in particular to a device for preventing loosening of the bolts which secure the bearing end cap to the axle.

There are several different forms of bearings for the journal of a railroad car axle which are inclusive of an end cap, bolted to the free end of the journal. The end cap serves the purposes of enclosing the end of the bearing and securing the bearing assembly axially to the journal.

It is common practice to afford a device of some kind for securing the fastening bolts against reverse rotation and consequent loosening, since a loose end cap can lead to bearing failure. However, our experience reveals that the devices as heretofore used are not always reliable, and the primary object of the invention is to prevent loosening of bearing end cap securing bolts in a more reliable manner and specifically to accomplish this by a unique combination of a template and individual lock plates associated therewith.

Other and further objects of the present invention with be apparent from the following description and claims and are illustrated in the accompanying drawing which, by way of illustration, shows preferred embodiments of the present invention and the principle thereof and what is now considered to be the best mode in which we have contemplated applying that principle. Other embodiments of the invention embodying the same or equivalent principle may be used and structural changes may be made as desired by those skilled in the art without departing from the present invention.

In the drawings:

FIG. 1 is a perspective view of the wheel and bearing of a railroad car in the process of having the present invention applied thereto;

FIG. 2 is a perspective view similar to FIG. 1 but on an enlarged scale showing the present invention in its applied form;

FIG. 3 shows a locking plate in accordance with the present invention; and

FIG. 3A is a sectional view showing an intermediate stage of application of the locking plate shown in FIG. 3.

FIG. 1 shows the wheel W of a railroad car on a rail R. The car has a truck which includes a side frame SF. An adapter 10 is located within the side frame and embraces the top of a housing 12 of a roller bearing which rotatably supports the journal end of the car axle, not shown.

The bearing structure includes an axle end cap 14 which secures the bearing assembly against endwise displacement. Accordingly, fastening bolts 15 are adapted to be extended through openings in the end cap and are threadedly engaged in tapped openings at the journal end of the car axle, not shown.

One form of known device for securing the bolts against inadvertent loosening is shown in FIG. 1 as consisting of a one-piece, triangular shaped template 20 having three openings as 21 for receiving freely the shanks of the three fastening bolts 15. It will be noted that the bolts 15 are of hex head form. The heads of the bolts have six flat sides (the so-called hex head bolt), the sides being separated at angle points.

The template 20, adjacent each opening 21, is provided with a set of two bendable lugs or tabs 23, and the practice heretofore has been to bend these tabs upwardly to lie against two adjacent flat sides of the hex head of the related bolt, the idea being that the tabs as thus bent will secure the bolts against loosening, that is, reverse rotation, but experience establishes that this safety feature is not always realized.

The axle cap is formed with a rigid, outwardly projecting peripheral rim 25 tending to afford a measure of protection for the bolts which, incidentally, will rotate with the car axle. Under the present invention, we take advantage of this rim or shoulder of the axle cap to provide a larger measure against loosening of the bolts, and in doing this we associate with the template a plurality of individual lock plates which will be three in number accordingly as there are three bolts 15.

One form of lock plate envisioned under the present invention is identified by reference character 26 in FIG. 3. It has an opening 27 with serrations 29 formed partially thereabout. These serrations are accurately dimensioned, uniformly distributed and sufficient in number to present adequate angles symmetrically related to the points of the hex head 15H for associating the lock plate 26 in a rotatable sense with the hex head 15H to capture it as shown in FIG. 3A. The part of the opening 27 without serrations provides adequate clearance to receive the template tabs when bent upwardly for fitting the lock plate over the hex head.

Each lock plate 26 is formed with an extension or tail 30 extended from the rim 31 and adapted to engage the inside face 25F of the rim 25, as shown in FIG. 3A.

The invention is applied by first arranging the template, FIG. 1, to register with the openings in the axle cap which receive the bolts. The bolts are then entered and tightened, FIG. 1, whereafter the lock tabs are then bent upwardly, or outwardly as it may be viewed, to bear against two adjacent, flat sides of each hex head 15H, as will be apparent from what is shown in FIG. 2. Next the three lock plates 26 are fitted over the hex heads, and sufficient clearance is available to enable this to be done even though the tabs 23 are in the bent position shown in FIG. 2. Care is taken in positioning the lock plates to have the extensions 30 as close as possible to engagement with the inside face of the rim of the axle cap. Finally, the tabs 23 are bent over to overlie the rim or circular portion 31 of each lock plate whereby the tabs as thus bent serve to secure the lock plates against endwise displacement from the hex heads of the bolts.

In the event that a bolt should tend to back off or loosen, the lock plate 26 will rotate therewith moving the extension 30 into firm contact with the inside face of the axle cap rim which represents a rigid abutment preventing further turning of the bolt.

It will be seen from the foregoing under the present invention we provide further security against loosening of the bolts by having resort to individual lock plates symmetrically fitted to and rotatably associated with the hex heads of the bolt, and we take advantage of the known device, the template 20, to hold the lock plates in place.

Therefore, while we have shown and described several embodiments, it is to be understood that these are capable of variations and modifications.

We claim:

1. In an axle cap fastened to the journal of a railroad car axle by bolts having flat-sided heads separated by angle points, whereby the cap rotates with the axle, the axle cap having openings for the bolts and having an outwardly projecting rigid peripheral rim, means to secure the bolts against loosening and comprising: a template having a plurality of openings therein registrable with the openings in the cap and adapted to receive the shanks of the bolts, tabs on said template adjacent the openings therein and upwardly bendable to neatly engage sides of the bolt heads, a plurality of individual lock plates each having a generally circular opening and a generally annular rim formed on the inner circumference with serrations in a pattern substantially matching at least a series of the angle points of the bolt heads and each fittable over the head of a bolt when the tabs are bent upwardly whereby the bolt head and a bent tab may be nested in the opening of a lock plate, each lock plate rim having a tail extending radially outwardly and engageable with said rigid rim upon rotation of a bolt, in a loosening direction, having a lock plate fitted to the head thereof, and each of said tabs when nested presenting a free end portion bent outwardly to overlie the lock plate rim thereby to secure each lock plate to the template.

* * * * *